No. 885,655. PATENTED APR. 21, 1908.
E. H. STICKELS.
HOLDER FOR SPARE TIRES.
APPLICATION FILED JUNE 16, 1906.
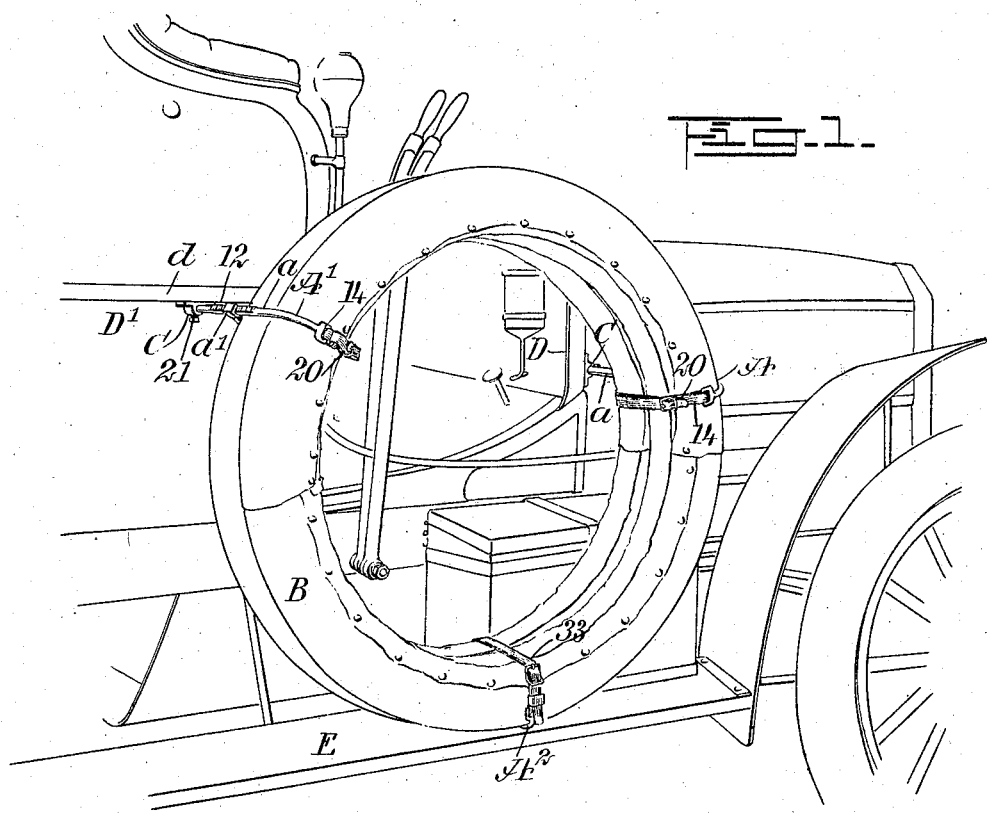
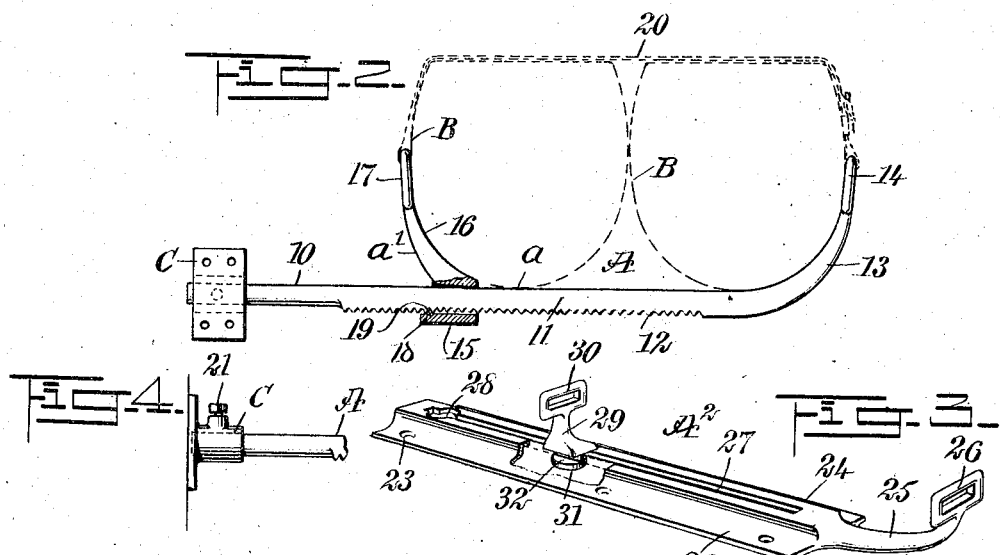
WITNESSES
INVENTOR
Edward H. Stickels
BY
ATTORNEYS

UNITED STATES PATENT OFFICE.

EDWARD H. STICKELS, OF EDGEWATER, NEW JERSEY.

HOLDER FOR SPARE TIRES.

No. 885,655.  Specification of Letters Patent.  Patented April 21, 1908.

Application filed June 16, 1906. Serial No. 322,017.

*To all whom it may concern:*

Be it known that I, EDWARD H. STICKELS, a citizen of the United States, and a resident of Edgewater, in the county of Bergen and State of New Jersey, have invented a new and Improved Holder for Spare Tires, of which the following is a full, clear, and exact description.

The purposes of the invention is to provide devices adapted for attachment to an automobile for the purpose of holding one or more spare tires in proper position relatively to the body of the vehicle, and to so construct said devices that they may be quickly and conveniently adjusted to receive different sizes of tires and hold them firmly to place, and so that the devices will not mar or injure the tires.

A further purpose of the invention is to provide holders of the character described which will be simple, durable and economic and which may be readily applied to any automobile without detracting from its appearance.

The invention consists in the novel construction and combination of the several parts, as will be hereinafter fully set forth and pointed out in the claims Reference is to be had to the accompanying drawings forming a part of this specification, in which similar characters of reference indicate corresponding parts in all the figures.

Figure 1 is a perspective view of a portion of an automobile and the improved holders applied; Fig. 2 is a sectional plan view of a side section of the holders; Fig. 3 is a perspective view of the bottom section of a set of holders, a portion being broken away; and Fig. 4 is a side elevation of a socket plate or fitting for one of the side sections, and a portion of said side section in its socket.

The holding device is constructed in three sections or pieces, two side sections A and A' which are alike in construction, and a bottom section A². Each side section A and A' consists of a body bar *a* and a sliding clamping member *a'*. The inner end portion 10 of a body bar *a* is preferably circular in cross section, and its intermediate portion 11 is flattened at its outer face, and said flattened surface is provided with transverse teeth 12. The outer end portion 13 of a body bar *a* is curved in direction of the bar opposite that provided with the said teeth 12, as is shown in Fig. 2. At the extremity of the curved end of the body bar *a* an eye 14 is formed preferably flat as illustrated.

The sliding member *a'* consists of a hollow base 15 open at each end, which base corresponds in cross section with the toothed intermediate section 11 of the body bar upon which said base freely slides. An arm 16 extends from the base 15 in the same direction as the curved end 13 of the body bar *a* on which the base is mounted, and terminate in an eye 17 also flat, which eye 17 faces the eye 14 of the body bar, as is shown in Fig. 2. The eyes 14 and 17 are in horizontal alinement, and the arm 16 is curved reversely to the curvature of the outer end 13 of the body bar, so as to obtain opposing curved surfaces of equal extent to receive between them one or more tires B and have constant and smooth bearing against the outer faces of the tires as is shown in Figs. 1 and 2.

In the further construction of the side sections A and A', a projection 18 is produced at the inner end of the outer wall of the base 15, and this projection or lip is provided with a tooth 19, adapted to fit any of the spaces between the teeth 12 on the body bar *a*. A strap 20, having a buckle or other suitable fastening device is passed through the eyes 14 and 17, thus connecting the two members A and A' at their free ends, and when the strap 20 is tightened, that is, after adjustment of the member *a'*, the lip 18 is inclined inward, causing the tooth 19 thereon to be brought into locking engagement with the teeth 12 of the body-bar *a*.

A socket plate or member C is employed to receive the inner end portion 10 of a body-bar *a*, and the bars are held in their socket-plates by set screws 21 or like devices. One socket-plate is usually attached to the dashboard D or other convenient forward section of the car, and the other is secured to the outer face D' of the driver's seat, beneath a rib or offset *d*, if one is formed upon the body of the car, as is shown in Fig. 1. When the side sections A and A' are in position on the car, their curved or gripping members face each other, being turned in opposite directions relatively to the front and rear of the car, as is clearly shown in Fig. 1.

The bottom section A² consists of a flat base 22, having apertures 23 therein to receive screws, and said base is provided with a longitudinal boss or rib 24 at its center, extending practically from end to end of the base, and at the outer end of the rib 24 an upwardly curved arm 25 is formed, which arm extends beyond the outer end of the base and terminates in a flat eye 26.

The rib 24 of the base 22 is provided with a longitudinal slot 27 in its upper face, extending nearly from end to end, and at the inner end of the slot 27 an enlargement 28 is made. A sliding member 29 is employed in connection with the base 22. This member extends upward from the slotted portion of the rib or boss 24 and terminates in an eye 30 which faces and is in horizontal alinement with the eye 26 on the arm 25 of the base as is clearly shown in Fig. 3; and at the bottom of the sliding arm 29 a button 31 is formed, of sufficient size to be passed through the enlargement 28 in the slot 27, and this button is provided with grooves 32 to receive the side edges of the slotted portion of the said rib 24 as is also shown in Fig. 3. A strap 33 having a suitably applied fastening device connects the eyes 26 and 30. The bottom member $A^2$ is placed transversely on the step E of the vehicle, with the arm 25 adjacent to the outer edge of the step; and the said bottom member $A^2$ occupies a position about centrally between the side sections A and A'.

The various sections being in position on the car, one or more tires B are placed between the clamping members of the sections, and the movable sections are then adjusted along their carrying or body sections until the tires are firmly clamped between opposing clamping members of the sections, whereupon the applied straps are tightened up, holding the parts in adjusted position and the tires firmly in the grip of the sections of the holders.

Having thus described my invention, I claim as new, and desire to secure by Letters Patent,—

1. In a holding device for spare tires, a fixed member, a movable member slidable on the fixed member, a strap secured to and connecting the members, and means whereby the movable member will be locked to the fixed member by the tightening of the strap.

2. In a holding device for spare tires, a fixed member having one end curved and provided with an eye, a movable member slidable on the fixed member and having an eye at its end, a flexible strap passed through the eyes of the members and provided with a fastening for connecting the ends thereof, and means whereby the movable member will be locked to the fixed member by the tightening of the strap.

3. In a holding device for spare tires, a fixed member having a curved end and provided with an eye in said end, a movable member provided with an eye facing the eye of the fixed member, and means for slidably mounting the movable member on the fixed member so that when pressure is applied to the outer end of the movable member it will be locked to the fixed member.

4. In a holding device for spare tires, a fixed member having teeth formed thereon and provided with a curved end having an eye therein, and a movable curved member slidably mounted on the fixed member and provided with an eye at its end, the said member being curved reversely to the curved end of the fixed member and provided with a tooth adapted to engage the teeth of the fixed member to lock said movable member in position.

5. In a holding device for spare tires, a fixed member having a curved arm terminating in an eye, a movable member slidable on the fixed member and adapted to bind against the fixed member when tension is exerted on said movable member in a direction at an angle to its sliding movement, the said member having a curved arm facing the curved arm of the fixed member and also terminating in an eye, the said arms being of less length than the width of the tire tube, and a strap connecting the eyes of said members, the strap being of greater length than the distance between the eyes, whereby when the strap is tightened the movable member is caused to bind against the fixed member.

In testimony whereof I have signed my name to this specification in the presence of two subscribing witnesses.

EDWARD H. STICKELS.

Witnesses:
WM. M. GREENE,
G. J. PURLEY.